United States Patent
Hong et al.

(10) Patent No.: US 6,923,392 B2
(45) Date of Patent: Aug. 2, 2005

(54) FREEZE-GRINDING METHOD OF THE WASTE MATERIALS USING THE COOLED AIR

(75) Inventors: Soon-Jin Hong, Yongin (KR); Kwang-Ho Choi, Seoul (KR); Kyu-Dong Lee, Seoul (KR); Kang-Yong Ryoo, Ansan (KR); Jang-Ho Lee, Namyangju (KR); Jin-Yong Im, Seoul (KR); Kyung-Sik Sohn, Anyang (KR); In-Ho Han, Anyang (KR)

(73) Assignee: Kolon Construction Co., Ltd., Kwacheon ( * ) Notice: Subject to any disclaimer, the term of this patent is extended or adjusted under 35 U.S.C. 154(b) by 0 days.

(21) Appl. No.: 10/468,525

(22) PCT Filed: Dec. 24, 2001

(86) PCT No.: PCT/KR01/02255

§ 371 (c)(1),
(2), (4) Date: Aug. 14, 2003

(87) PCT Pub. No.: WO03/041931

PCT Pub. Date: May 22, 2003

(65) Prior Publication Data

US 2004/0231342 A1 Nov. 25, 2004

(30) Foreign Application Priority Data

Nov. 15, 2001 (KR) ........................... 2001-70924

(51) Int. Cl.[7] ........................... B02C 11/08; F25D 13/06
(52) U.S. Cl. ............................. 241/23; 62/63
(58) Field of Search ............................. 241/23, 24, 65, 241/66, 67, 79.1; 62/62, 63, 615, 616, 320

(56) References Cited

U.S. PATENT DOCUMENTS

| | | | | |
|---|---|---|---|---|
| 3,771,729 A | * | 11/1973 | Frable | 241/65 |
| 3,804,339 A | * | 4/1974 | Laws et al. | 241/17 |
| 3,885,744 A | | 5/1975 | Drage | |
| 3,897,010 A | * | 7/1975 | Weishaupt et al. | 241/5 |
| 3,921,917 A | * | 11/1975 | Meinass | 241/17 |
| 4,025,990 A | | 5/1977 | Lovette, Jr, | |
| 4,056,231 A | * | 11/1977 | Townsend | 241/23 |
| 4,102,503 A | * | 7/1978 | Meinass | 241/18 |
| 4,273,294 A | * | 6/1981 | Hollely et al. | 241/18 |
| 4,813,614 A | | 3/1989 | Moore et al. | |
| 4,863,106 A | * | 9/1989 | Perkel | 241/5 |
| 5,025,632 A | * | 6/1991 | Spritzer | 62/64 |
| 5,375,580 A | * | 12/1994 | Stolz et al. | 123/527 |
| 5,408,846 A | | 4/1995 | Reali et al. | |
| 5,524,838 A | * | 6/1996 | Ellers et al. | 241/23 |
| 5,588,600 A | | 12/1996 | Perfido et al. | |
| 5,634,599 A | | 6/1997 | Khais et al. | |
| 5,927,620 A | * | 7/1999 | Memon | 241/17 |
| 6,668,562 B1 | * | 12/2003 | Shatten et al. | 62/50.2 |

* cited by examiner

*Primary Examiner*—Denise L. Esquivel
*Assistant Examiner*—Richard L. Leung
(74) *Attorney, Agent, or Firm*—Blakely Sokoloff Taylor & Zafman

(57) ABSTRACT

In method for freeze-crushing waste resources, freezing gas is first created by collecting freezing heat source of liquefied petroleum gas during a heat exchange process between the liquefied petroleum gas and cooling gas, and then the waste resources stored in a freezing tank is frozen to a temperature where the waste resources can be easily crushed by supplying the freezing gas to the freezing tank. Next, the frozen waste resources is crushed in an crushing apparatus, after which the freezing gas is separated from the crushed waste resources in a separate apparatus and the freezing gas for is collected the purpose of reuse.

5 Claims, 1 Drawing Sheet

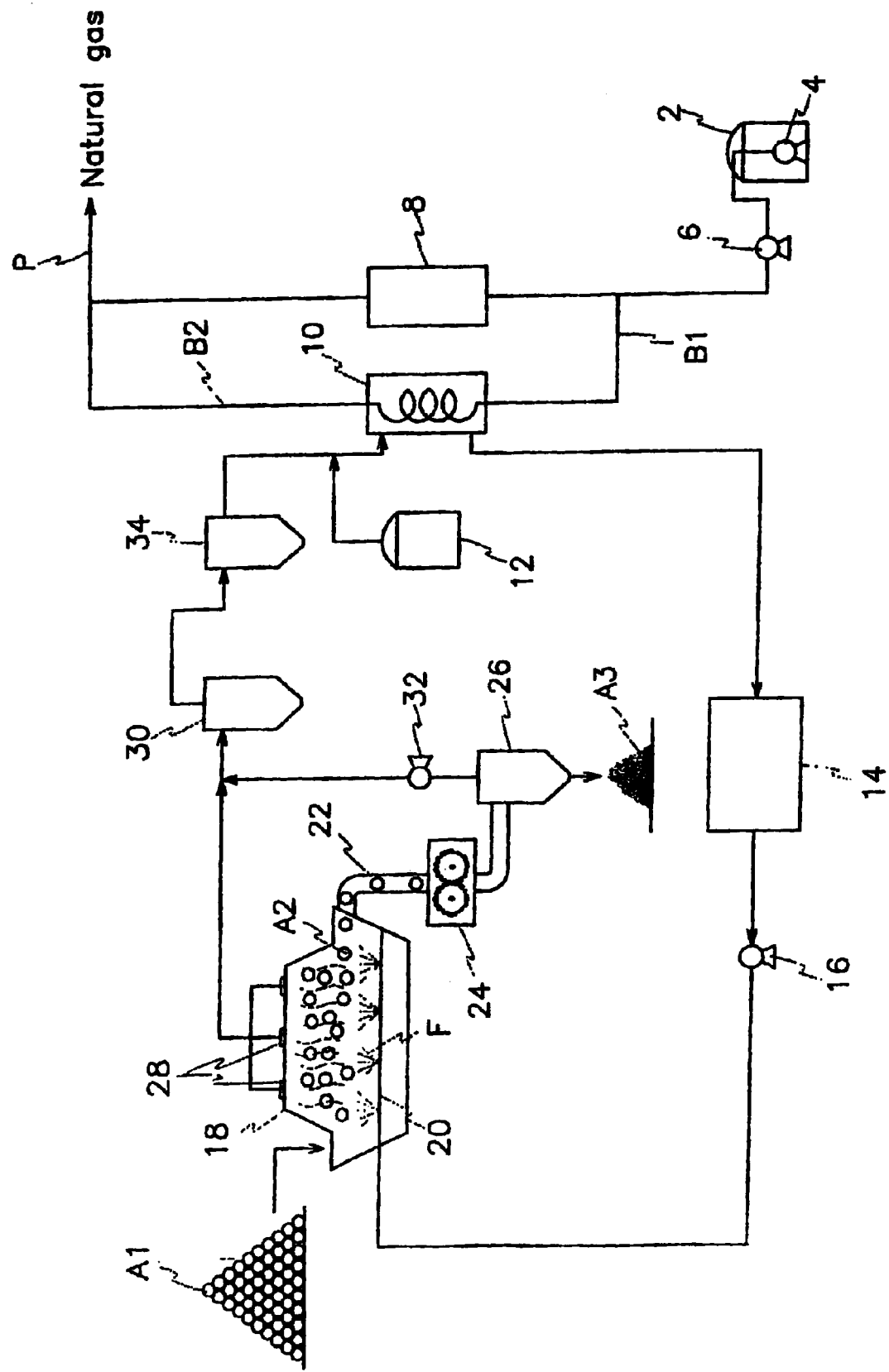

US 6,923,392 B2

FREEZE-GRINDING METHOD OF THE WASTE MATERIALS USING THE COOLED AIR

The present patent application is a non-provisional application of International Application No. PcT/KR01/02255, filed Dec. 24, 2001.

BACKGROUND OF THE INVENTION (a) Field of the Invention

The present invention relates to a method for freeze-crushing waste resources by use of freeze-gas and, more particularly, to a freeze-crushing method that can effectively obtain recycled raw materials in the form of powder by supplying freeze-gas obtained from liquefied petroleum gas to the waste resources and freeze-crushing waste resources.

(b) Description of Prior Art

Generally, it is well known that waste resources such as waste tires, waste rubber, and waste plastic are recycled by being collected and frozen to a temperature where they can be crushed in the form of powder.

The method for crushing the waste resources in the form of powder can be classified into a high-temperature-crushing method and a freeze-crushing method. In the freeze-crushing method, liquefied nitrogen or liquefied petroleum gas is used as a freeze source.

In the high-temperature crushing method, the waste resources are crushed by a frictional crusher without going through a freezing process, thereby obtaining recycled raw material in the form of powder. In the freeze-crushing method, the waste resources are freeze-crushed by a variety of freeze media, thereby obtaining recycled raw material in the form of powder.

SUMMARY OF THE INVENTION

The high-temperature-crushing method is lower in its equipment investment fees, but high in its maintenance fees as the power for operating the equipment is highly consumed. Furthermore, as it is difficult to separate alien substances contained in the waste resources, the purity of the recycled powder is deteriorated and the recycling rate of the waste resources is low. In addition, since the powder is denatured by the friction heat, the quality of the secondary goods made of the recycled powder is deteriorated.

In the freeze-crushing method using the liquefied nitrogen gas, since the waste resources is crushed at a very low temperature, the waste resources is not denatured, thereby obtaining a high quality of recycled raw material in the form of powder. However, the use of the liquefied nitrogen gas increases the recycling fees.

In addition, in the freeze-crushing method using the liquefied petroleum gas, the waste resources are frozen by being dipped into a heat exchange medium frozen by heat exchange, and then crushed. The heat exchange medium and the waste resources should be completely separated during the period between the freezing process and the crushing process. However, during the period, the frozen waste resources may thaw. This may make it impossible to perform the freeze-crushing process. This is noted that it is impossible to completely separate the heat exchange medium from the waste resources.

Particularly, when the powder has a large-sized contact area with the heat exchange medium, the above problem becomes more serious. Therefore, to crush the waste resources in a frozen state, since both of the powder and the heat exchange medium should be supplied to the crushing equipment, the loss of the heat exchange medium is inevitable.

Therefore, the present invention has been made in an effort to solve the above-described problems.

It is an objective of the present invention to provide a method for freeze-crushing waste resources such as waste tires, rubber and plastic by use of liquefied petroleum gas as a freezing source, thereby obtaining recycle raw material in the form of powder with the minimized expenses.

To achieve the above objective, the present invention provides a method for freeze-crushing waste resources, comprising:

creating freezing gas by collecting a freezing heat source of liquefied petroleum gas during a heat exchange process between the liquefied petroleum gas and cooling gas;

freezing the waste resources stored in a freezing tank to a temperature where the waste resources can be easily crushed by supplying the freezing gas to the freezing tank;

crushing the frozen waste resources in an crushing apparatus; and separating the freezing gas from the crushed waste resources in a separate apparatus and collecting the freezing gas for the purpose of reuse.

The freezing gas is formed of gas that can be maintained in a vapor state at a temperature of −170° C., the gas being selected from the group consisting of nitrogen, oxygen, and a mixture gas thereof.

The step of freezing comprises the step of spraying freezing gas to the waste resources in the freezing tank, thereby letting the waste resources move to maximize the freezing efficiency.

The method may further comprise the step of, after the step of collecting the freezing gas, eliminating alien substance contained the crushed waste resources by use of specific gravity difference.

The step of crushing comprises the step of eliminating heat, generated during the crushing step, by supplying freezing gas to the crushing apparatus, thereby maximizing crushing efficiency.

BRIEF DESCRIPTION OF THE DRAWING

The FIGURE is a schematic diagram illustrating a method for freeze-crushing waste resources according to a preferred embodiment of the present invention.

DETAILED DESCRIPTION OF THE INVENTION

A preferred embodiment of the present invention will be described more in detail in conjunction with the accompanying drawing.

The FIGURE shows a method for freeze-crushing waste resources using frozen gas.

As shown in the drawing, a first very low temperature pump 4 is installed in a tank 2 for reserving liquefied petroleum gas. The first very low temperature pump 4 supplies the liquefied petroleum gas to a second very low temperature pump 6. The second very low temperature pump 6 further supplies the liquefied petroleum gas to a vaporizing heat exchange system 8 using seawater. A branch tube Bi is disposed on a conduit connecting the second very low temperature pump 6 to the vaporizing heat exchange system 8 so as to supply high pressure liquefied petroleum gas to a freezing source recovering heat exchange system 10, thereby vaporizing the liquefied petroleum gas. The petroleum gas is directed to a main tube P through an exhaust tube B2 and then supplied to consuming place together with the petroleum gas created at the heat exchange system 8.

At this point, freezing gas stored in a freezing gas supply tank 12 is supplied to the heat exchange system 10 to which the liquefied petroleum gas to create very low temperature freeze gas. This very low temperature freezing gas is stored in a freezing gas reserving tank 14.

The freezing gas stored in the reserving tank 14 is sprayed through a spraying nozzle 20 installed on a bottom of a freezing tank 18 by use of a blower 16. The waste resources A1 such as waste tires, waste rubber, and waste plastic are input into the freezing tank 18.

The waste resources A2 input to the freezing tank 18 are continuously moved by the spraying force of the freezing gas F sprayed through the spray nozzle 20, and then finally frozen to be capable of being crushed.

Since the waste resources A2 continuously moves in the freezing tank 18 by the spraying force of the freezing gas F, the freezing efficiency of the waste resources is maximized.

Staying time of the waste resources A2 in the freezing tank 18, that is, the freezing time, may be varied by varying the angles of the and freezing tank 18 and the spray nozzle 20 that are installed to be declined at a predetermined angle with respect to a horizontal plane.

Preferably, an angle adjustment device (not shown) for adjusting the angle of the freezing tank 18 and the spray nozzle 20 may be further provided.

Accordingly, the waste resources A2 supplied to the freezing tank 18 stay in the freezing tank 18 at a predetermined time according to the spraying angle of the freezing tank 18 and the spray nozzle 20 and frozen while being moved. The frozen waste resources A2 is directed to a crushing apparatus 24 through an outlet 22 formed on a sidewall of the freezing tank 18, and then crushed to recycled raw material A3. This recycled raw material A3 is directed to a separate apparatus 26.

At this point, the freezing gas F sprayed from the spray nozzle 20 is absorbed by an absorbing conduit 28 installed on an upper portion of the freezing tank 18, and then directed to an alien substance separating apparatus 30.

When the waste resources A2 supplied to the crushing apparatus 24, they are mixed with freezing gas by the spraying pressure of the spray nozzle 13. The freezing gas mixed with the waste resources eliminates heat generated during the crushing process, thereby improving the crushing efficiency.

Furthermore, the crushed raw material A3 is also supplied to the separate apparatus 26 together with a few freezing gas. This freezing gas together with alien substances contained in the raw material A3 is supplied a selection apparatus 30 installed above the separate apparatus 26 by an exhaust pump 32, and the raw material A3 is directed to the separate apparatus 26 by self-gravity.

As a result, the freezing gas, and the alien substances contained in the raw material A3 are completely separated so that the raw material can be recyclable.

In addition, the freezing gas and the alien substances directed from the separate apparatus 26 to the selection apparatus 30 and the freezing gas and the alien substances absorbed in the absorbing duct 28 become get together in the selection apparatus 30, and then the alien substances are accumulated in the selection apparatus 30 by a difference in a specific gravity from the freezing so that they can be removable, and the collected freezing gas is purified by a purifier 34 and directed again to the heat exchange system 10.

Accordingly, the freezing gas can be repeatedly used for collecting the freezing source of the liquefied petroleum gas as it continuously circulates in the system.

As described above, as freezing heat source of the liquefied petroleum gas, which will be wasted by heat exchange during the vaporizing process of the liquefied petroleum gas for the supply to its consuming place, is collected and used as freezing source for recycling the waste tires, rubbers, and plastic, the recycling fees can be minimized.

What is claimed is:

1. A method for freeze-crushing waste resources, comprising:

supplying liquefied petroleum gas to a heat exchange system using seawater;

creating freezing gas by collecting a freezing heat source of liquefied petroleum gas during a heat exchange process between the liquefied petroleum gas and cooling gas;

freezing the waste resources stored in a freezing tank to a temperature where the waste resources can be easily be crushed by supplying the freezing gas to the freezing tank, freezing including continuously moving the waste resources;

crushing the frozen waste resources in a crushing apparatus; and separating the freezing gas from the crushed waste resources in a separate apparatus and collecting the freezing gas for the purpose of reuse, wherein the waste resources being one of waste tires, waste rubber and waste plastic.

2. The method of claim 1, wherein the freezing gas is formed of gas that can be maintained in a vapor state at a temperature of −170° C., the gas being selected from the group consisting of nitrogen, oxygen, and a mixture gas thereof.

3. The method of claim 1, wherein the freezing comprises spraying freezing gas to the waste resources in the freezing tank to let the waste resources continuously move to maximize the freezing efficiency.

4. The method of claim 1, further comprising:

after collecting the freezing gas, eliminating alien substance contained in the crushed waste resources by use of specific gravity difference.

5. The method of claim 1, wherein crushing comprises eliminating heat, generated during crushing, by supplying freezing gas to the crushing apparatus to maximize crushing efficiency.

* * * * *